Nov. 7, 1944.　　T. J. WATSON　　2,362,037
PUNCHING MACHINE
Filed Dec. 28, 1943　　3 Sheets-Sheet 1

INVENTOR
THOMAS J. WATSON
BY
ATTORNEY

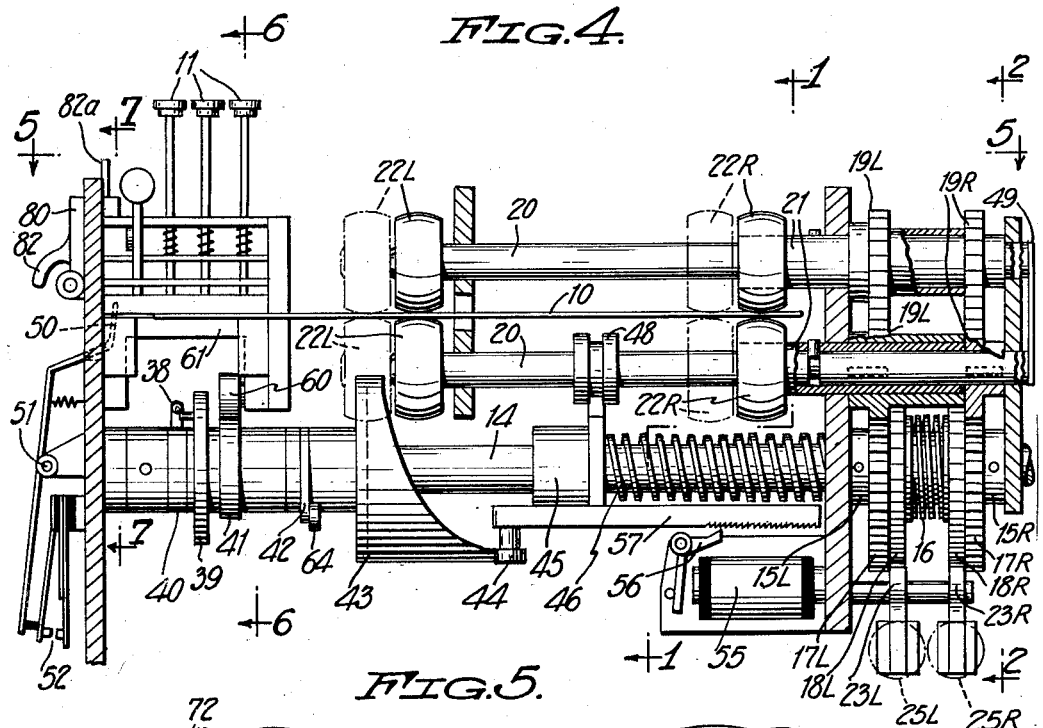

Nov. 7, 1944.   T. J. WATSON   2,362,037
PUNCHING MACHINE
Filed Dec. 28, 1943    3 Sheets-Sheet 3
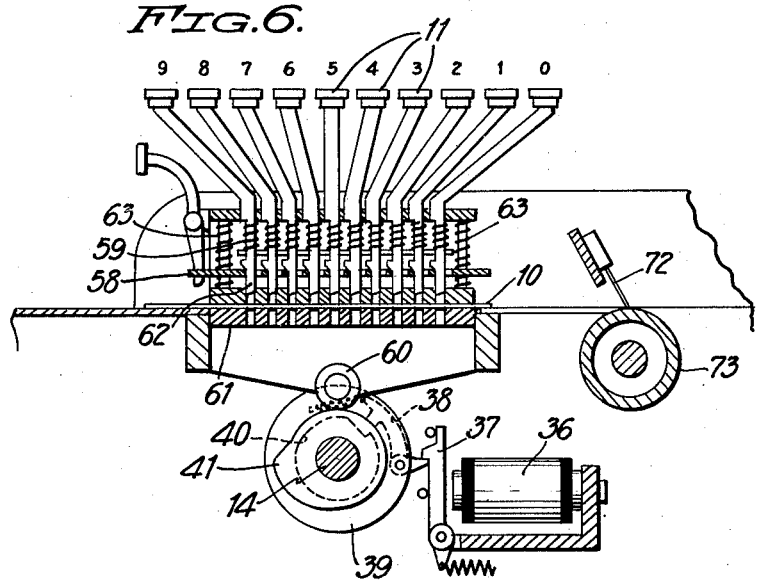
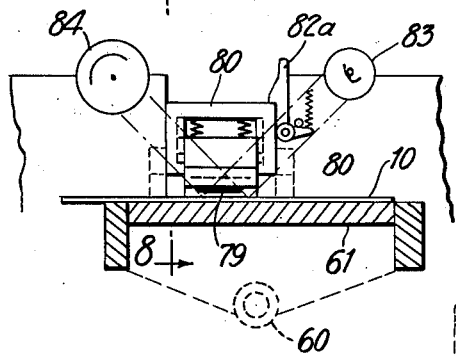
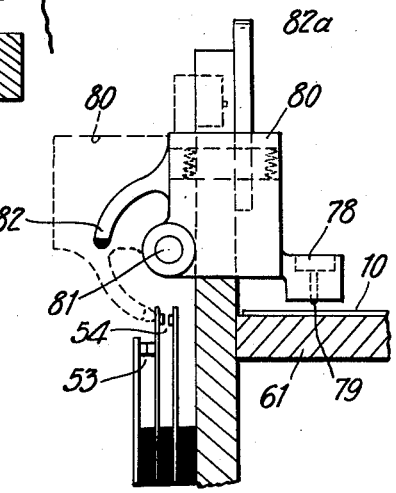
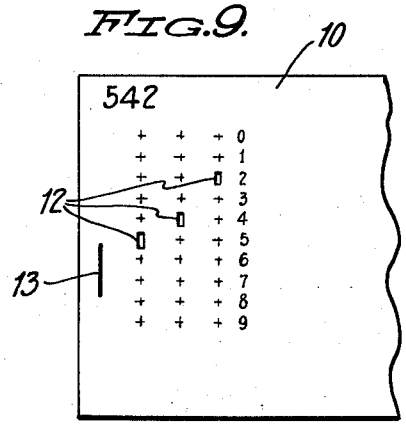
INVENTOR
THOMAS J. WATSON
BY
ATTORNEY Patented Nov. 7, 1944

2,362,037

UNITED STATES PATENT OFFICE 2,362,037

PUNCHING MACHINE

Thomas J. Watson, New Canaan, Conn., assignor to International Business Machines Corporation, New York, N. Y., a corporation of New York Application December 28, 1943, Serial No. 515,885

10 Claims. (Cl. 164—111)

This invention relates to record controlled machines, and more particularly to machines for perforating records in accordance with data designations.

The principal object of the invention is to provide a machine for automatically handling bank checks, deposit slips, and other documents wherein the various records to be handled are not of the same dimensions. In other words, among a given group of records to be handled some may be wider and/or longer than others. It is desirable in recording data on such records, where the recording may be in the form of punching, printing or like methods of data designation, that the designations be made in some predetermined area with respect to one of the corners of the record formed by two intersecting edges thereof.

In carrying out the objects of the invention, there is provided a keyboard upon which the data to be recorded on the check or other document is manually set up. The check is then inserted into the machine where feeding mechanism advances it to a position beneath the punches or other recording instrumentalities. The feeding means is arranged so that, as the check advances to the recording position, its leading edge is aligned at right angles to the direction of travel, if it is not already so aligned. The forward movement of the check is then interrupted and the check is moved transversely until it is in a predetermined position. At such time the recording devices are operated and will record the setup data in positions having a definite relationship with the two intersecting edges of the record. Thereafter, the forward feeding of the record is resumed, and it passes sensing devices which sense the designations just made and control sorting mechanism to sort the records into compartments determined by the value of the data recorded. In the recording position there is provided means for placing a datum line on the record which will serve in subsequent handling of the record as a lateral locating means for controlling the positioning of the record.

Other objects of the invention will be pointed out in the following description and claims and illustrated in the accompanying drawings, which disclose, by way of example, the principle of the invention and the best mode, which has been contemplated, of applying that principle.

In the drawings:

Fig. 4 is a transverse section of the machine looking in the direction of lines 4—4 of Fig. 1.

Fig. 5 is a plan view looking in the direction of lines 5—5 of Fig. 4.

Fig. 6 is a section through the punching mechanism taken substantially along lines 6—6 of Fig. 4.

Fig. 7 is a detail showing the locating line printing and sensing device, the section being substantially along lines 7—7 of Fig. 4.

Fig. 8 is an enlarged detail of the locating line printing device, the section being substantially along lines 8—8 of Fig. 7.

Fig. 9 is a fragment of a record showing the relative location thereon of the data designations and the locating line.

Figure 1:
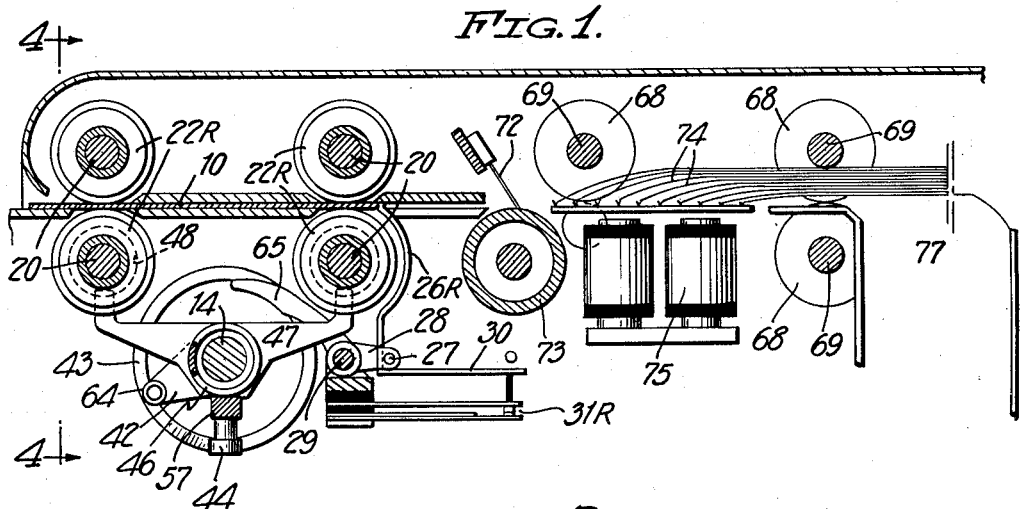
Fig. 1 is a central section through the machine showing the feed rollers and data sensing devices, the section being taken along lines 1—1 of Fig. 4.

Referring to Fig. 9, the record 10 before insertion in the machine may be in the form of a check, deposit slip or any other form of record and may contain suitable printed matter (not shown). In addition, it may contain a classification or check number, such as 542, indicated in the upper left hand corner of Fig. 9. This number is set up manually by the operator on keys 11 (Figs. 4 and 6), and the check is then inserted in the machine and automatically advanced to a position where perforations 12 are made in the index point positions of three columns to represent the value 542. In addition, a locating line 13 may be printed on the record. Before punching of the data is effected, the record is so aligned with respect to the punching devices that the data recorded thereon will bear a predetermined relationship to the upper left hand edges as viewed in Fig. 9, and this relationship will be obtained for all records passed through the machine and applies to those having dimensions different from the record shown in Fig. 9.

Referring to Fig. 4, 14 represents a constantly rotating shaft which is driven by any suitable means, such as a motor (not shown). Secured to shaft 14 are two friction disks 15R and 15L. A spring 16 presses a gear 17R, integral with a ratchet 18R, against disk 15R and at the same time presses a gear 17L, integral with a ratchet 18L, against disk 15L so that, as shaft 14 rotates, the gears 17L and 17R are frictionally driven therewith.

Figure 2:
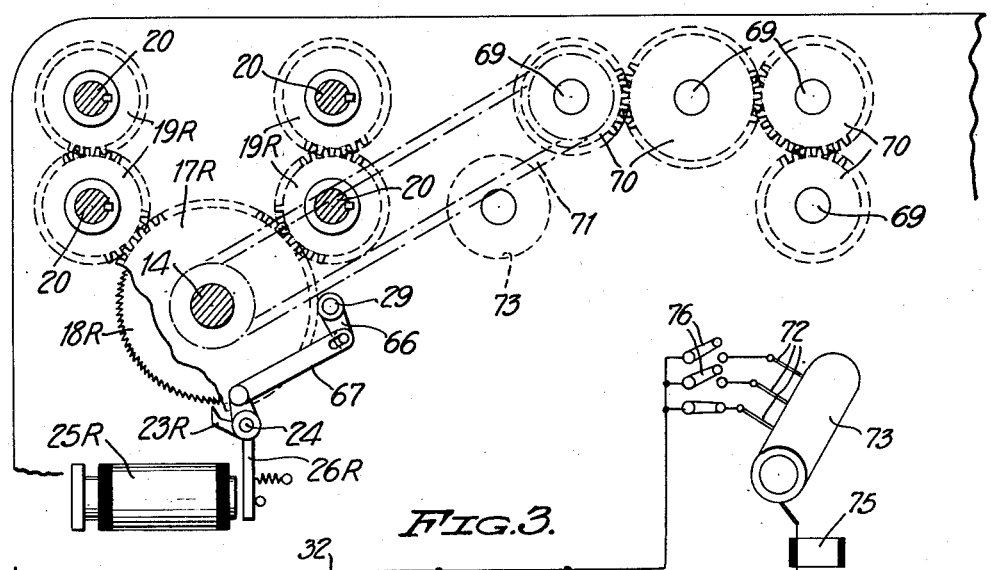
Fig. 2 is an outside view looking in the same direction as Fig. 1, showing the drive connections to the feed roller shafts. This section is substantially along lines 2—2 of Fig. 4.

In Fig. 2 gear 17R drives gears 19R keyed on shafts 20. The key connection permits relative axial movement between the gears and the shafts for the purpose to be described. The gear 17L (Fig. 4) drives a pair of gears 19L coaxial with gear 19R and keyed on sleeves 21, so that the sleeves may move axially with respect to gear 19L. At their left ends the shafts 20 have rollers 22L secured thereto and at their left end the sleeves 21 have rollers 22R secured thereto. Thus, through the connections traced rollers 22L are driven by gear 17R and rollers 22R are driven by gear 17L.

Referring to Fig. 2, the ratchet 18R may be engaged and stopped by a pawl 23R pivoted at 24. Energization of the magnet 25R will attract its armature 26R to rock pawl 23R into engagement with the ratchet. This then will interrupt rotation of the gear 17R and as a result rotation of shafts 20 and rollers 22L will be interrupted. A similar pawl 23L (Fig. 4) is provided for ratchet 18L and, when magnet 25L is energized, this pawl will engage ratchet 18L and interrupt further rotation of gear 17L and rollers 22R.

With rollers 22L and 22R rotating, the operator inserts check 10 between the rollers 22L and 22R of the first set (Figs. 1 and 5). These rollers advance the check to the second set of rollers and, as the check continues to advance, its leading edge will engage and rock spaced levers 26R and 26L. These levers are pivoted at 27 on arms 28 secured to a rod 29. When the leading edge of the record strikes the upper end of lever 26R, for example, the lever is rocked slightly clockwise about its pivot 27 and through an arm 30 closes a pair of contacts 31R. The lever 26L operates in exactly the same manner to close a pair of contacts 31L when it is engaged by the leading edge of the card. It will be apparent that, if the check as it advances toward the levers 26L and 26R is slightly out of parallel with the horizontal line as viewed in Fig. 5, one of the contacts will be closed before the other.

Figure 3:
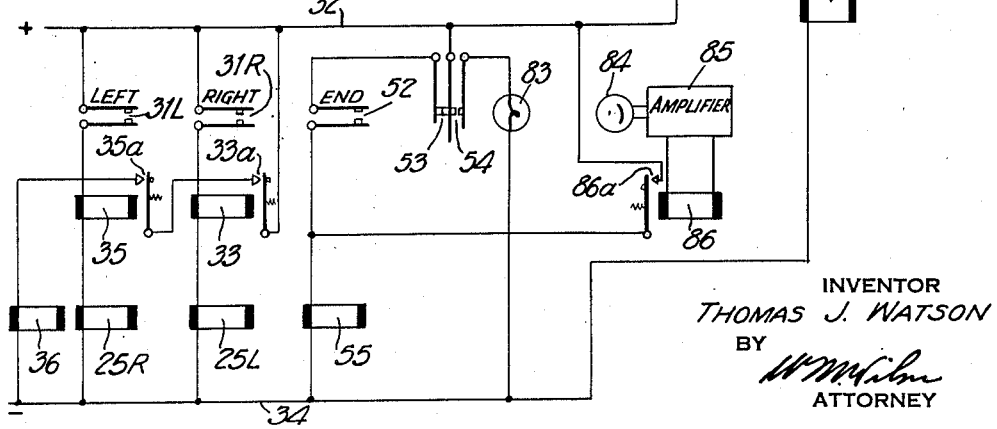
Fig. 3 is a wiring diagram of the electrical circuits of the machine.

Referring to Fig. 3, when the contacts 31R close, a circuit is completed from positive side of line 32, through contacts 31R, a relay 33 and magnet 25L to negative line 34. As we have seen, energization of magnet 25L will interrupt further rotation of rollers 22R, while rollers 22L continue to rotate and in doing so the record 10 will be rotated clockwise as viewed in Fig. 5, until the leading edge ultimately engages lever 26L and closes contacts 31L, which then completes a circuit in Fig. 3 through relay 35 and magnet 25R to interrupt further rotation of the rollers 22L. At this point the leading edge of the card is now properly aligned or squared in its direction of travel. The pressure of the rollers on the record is such as to permit slight slippage as the record is turned in its plane of travel. When both contacts 31L and 31R are closed, the two relays 33 and 35 will also be energized and their respective contacts 33a and 35a will be closed, completing a circuit from line 32 serially through contacts 33a and 35a to energize a clutch magnet 36.

Referring to Fig. 6, when magnet 36 is energized it attracts its armature 37 and releases a spring pressed clutching dog 38, which is pivoted on a disk 39 freely rotatable on shaft 14. Secured to shaft 14 is a clutch driving element 40, so that when magnet 36 is energized, disk 39 is coupled to shaft 14 for rotation therewith. Referring to Fig. 4, the disk 39 is integral with a cam 41, an arm 42 and a second cam 43, so that these parts now rotate with the shaft 14. A follower roller 44 now moves toward the left as viewed in Fig. 4 and is integral with a sleeve 45, which is urged toward the left by the coil spring 46. Extending upwardly from the sleeve is a pair of arms 47 which extend into grooved rollers 48 secured on the lower shafts 20. The shafts 20 are connected by straps 49 (see Fig. 4) so that, as sleeve 45 moves toward the left carrying with it rollers 48, the four shafts 20 move therewith and, since the rollers 22L and 22R are now stationary, they move the card therewith toward the left until the left edge of the card engages lever 50 and rocks it about its pivot 51 to close a pair of contacts 52. Closure of these contacts will complete a circuit traceable in Fig. 3 from line 32, a pair of normally closed contacts 53, contacts 52, a magnet 55 to line 34.

In Fig. 4 energization of magnet 55 will rock a pawl 56 into engagement with ratchet teeth on a bar 57 secured to sleeve 45, so that further movement of the card toward the left is interrupted. At this point then, the card is fully aligned in both a vertical and a lateral direction. After disk 39 has rotated through an angle sufficient to provide for the maximum lateral movement, cam 41 functions to cause punching of the setup data on the check.

Referring to Fig. 6, depression of any key 11 will cause the stem to move downwardly and become latched under a plate 58 which locks the depressed key against upward movement until plate 58 is shifted to the left to release the stem for return by its spring 59. Thus, with a setting on keys 11, when cam 41 operates to elevate roller 60, die plate 61 is pressed against the locked punch ends 62 of the keys to effect a perforation in the selected positions. Compression springs 63 serve to return the die to its downward position after punching has been effected. After this the roller 64 on arm 42 (Fig. 1) will engage lever 65 to rock rod 29. This will move levers 26R and 26L downward out of engagement with the front edge of the card, and in Fig. 2 shaft 29 through arm 66 and link 67 will rock pawl 23R out of engagement with ratchet 18R. A similar link 67 will rock pawl 23L out of engagement with ratchet 18L, so that both of these ratchets are now driven by shaft 14 and the record will be advanced by the now rotating rollers 22L and 22R.

When it has advanced beyond levers 26L and 26R, the levers are free to return to their intercepting positions in readiness to position the next record. Rollers 68 now advance the record through the sorting part of the machine. These rollers are mounted on shafts generally designated 69 which are driven by gears generally designated 70 (Fig. 2), and one of these shafts has belt and pulley connection 71 with the shaft 14, so that these rollers 68 are in constant rotation. The sorting mechanism is of well known construction and is, therefore, only diagrammatically represented in Fig. 1. It comprises brushes 72 positioned to traverse the columns of the card in which punching has been effected and make contact through the perforations with contact roller 73. The leading edge of the card passes successively under the ends of sorting blades 74, and upon sensing a perforation a circuit is completed to sorting magnet 75, which will open a passageway for the card between two of the blades, through which passageway the card is guided to an appropriate receiving pocket. The sorting function may be omitted by opening the electrical connection to all the brushes 72 as by switches 76 shown in Fig. 3. In such case, the magnet 75 will not become energized and all the records will pass beneath all the ends of blades 74 and pass into the first pocket designated 77.

To print the locating line 13 of Fig. 9, there is provided an inking medium 78 (Fig. 8) which comprises a narrow inked wick 79 carried by a block 80, which is pivoted at 81 and held in the position shown in Fig. 8 by a spring pressed latch 82 (see Fig. 7). Thus, when the punch die 61 moves upwardly, the wick 79 will contact the record 10 and make a mark or line thereon. The mark 13 as thus made may serve as a locating means in some subsequent passage of the record through the present machine. When occasion for utilizing the mark arises, as where the left end of the record has become damaged or trimmed so that the data designations are no longer in the proper location with respect to the left end of the sheet, the block 80 (Fig. 8) is rotated through 90° to the dotted line position shown. When in such position, a finger 82 thereon will cause opening of the contacts 53 and closure of the contacts 54.

Referring to Fig. 3, the opening of contacts 53 will render the end contacts 52 ineffective and the closure of contacts 54 will illuminate a lamp 83. This lamp is shown diagrammatically in Fig. 7, and in line therewith is a light responsive tube 84 so positioned that, when the block 80 is swung to its dotted line position of Fig. 8, light from the lamp 83 will be reflected from the surface of record 10 on to the cell 84 from the area, which will be traversed by the ink line 13 when the record 10 is moved laterally. Thus, during the lateral movement of the record, the ink line will alter the amount of light reflected and cause the photocell 84 through an amplifier 85 (Fig. 3) to energize a relay 86, which will thereupon close its contacts 86a and energize the magnet 55 to stop the lateral movement of the record in the manner already explained.

From the foregoing explanation, it will be apparent that records passed through the machine will be aligned, recorded upon, and then sorted in accordance with the recorded data. Alternatively, the sorting may be omitted. Also, by not setting the keys 11, cards already containing recording may be passed through the machine, aligned either with the left edge or the special datum line 13 as a guide, and then sorted in accordance with the data recordings.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a record controlled perforating or like machine, means to feed a record linearly along a normal line of feed, a pair of spaced fingers positioned and spaced on a line transverse to the line of feed and engageable by the leading edge of the record, means controlled by said fingers when both are engaged by the leading edge of the record for interrupting said feeding means, further means controlled thereby for effecting a lateral shift of said record, means controlled by the record for interrupting said lateral shift when an edge of the card parallel to the line of feed reaches a predetermined position, and means for thereafter recording upon the positioned record.

2. In a record controlled perforating or like machine, means to feed a record linearly along a normal line of feed in which the leading edge of the record may be at an angle to a line parallel to the line of feed, means engageable by the leading edge of the record for causing displacement of the record to bring its leading edge at right angles to the line of feed and for stopping the record in such position, means controlled by said engageable means to cause a lateral shift of the record transverse to its line of travel, and means engaged by an edge of the record for limiting the extent of such shift.

3. In a machine of the class described, a punching station, means for feeding a record to said station, and means controlled by two intersecting edges of the record for effecting movement of the record into a predetermined location with respect to the punching station and for stopping the record in such location.

4. In combination, means for operating upon particular parts of records fed thereto, means to feed a record to the first named means, means for effecting a turning of the record in the plane of its surface to bring its leading edge into a line transverse to the line of travel of the record, said effecting means causing stopping of the feeding means when the record has been turned into aligned relationship with the line of travel.

5. In combination, means to feed records along a straight path to mechanism with which said records must be registered, means to shift the records laterally, means to turn the records in the plane of their surfaces to bring a particular part of each record into registry with a particular part of said mechanism, and means for sensing the registry of said particular parts and operative to terminate said shifting and turning movements.

6. In a machine of the class described, means for feeding records of varying dimensions along a line of travel, a row of recording devices extending in the direction of travel of the records, and means controlled by the leading and by an adjacent edge of each record as it is fed, for shifting the record in its path of travel to bring a line thereon into registry with said row of recording devices, to receive data on a line of the record a predetermined distance from said adjacent edge and a predetermined distance from said leading edge.

7. In a machine of the class described, means for feeding a record along a line of travel, said record having a row of data designations spaced along a line in the direction of travel of the record, a sensing device responsive to said designations as the record passes the device, an aligning position in advance of the sensing device, means controlled by the record when it reaches said aligning position for causing shifting and turning of the record to bring the row of designations into alignment with said sensing device, so that the said row will subsequently traverse said device.

8. In a card feeding device, a pair of feed rollers, spaced along a common axis, means for rotating both rollers at the same rate to advance a record along a line of travel, transverse to said common axis, and means controlled by the record for causing the two rollers to rotate at different rates to cause turning of the record in its plane of travel, and further means for shifting both rollers in the direction of the common axis to displace the record laterally in its plane of travel.

9. In a machine of the class described, in combination, a punching mechanism, a data sensing mechanism, means for feeding records of varying dimensions to said punching mechanism and then to said sensing mechanism, means at said punching mechanism for causing shifting of said records to bring the leading edge and an adjacent edge of each record in a predetermined relationship with the punching mechanism, so that punching is effected in the same relative place on each record, said sensing mechanism being located to sense the perforated data.

10. In a machine of the class described, a data sensing device, means for feeding a record to said device, said record having a row of data designations extending in the direction of feeding of said record, means located in the path of travel of the record to cause adjustment thereof, so that its leading edge is at right angles to the line of travel and an adjacent edge bears a predetermined relationship to said sensing device, said last named means causing interruption of the record and alignment thereof prior to its arrival at said sensing device.

THOMAS J. WATSON.